(12) United States Patent
Hara et al.

(10) Patent No.: US 10,968,983 B2
(45) Date of Patent: Apr. 6, 2021

(54) POWER TRANSMISSION DEVICE

(71) Applicant: UNIVANCE CORPORATION, Kosai (JP)

(72) Inventors: Tomoyuki Hara, Kosai (JP); Kotaro Hirano, Kosai (JP)

(73) Assignee: UNIVANCE CORPORATION, Kosai (JP)

( * ) Notice: Subject to any disclaimer, the term of this patent is extended or adjusted under 35 U.S.C. 154(b) by 0 days.

(21) Appl. No.: 16/490,726

(22) PCT Filed: Mar. 20, 2018

(86) PCT No.: PCT/JP2018/011093
§ 371 (c)(1),
(2) Date: Sep. 3, 2019

(87) PCT Pub. No.: WO2018/174067
PCT Pub. Date: Sep. 27, 2018

(65) Prior Publication Data
US 2020/0003279 A1    Jan. 2, 2020

(30) Foreign Application Priority Data
Mar. 22, 2017 (JP) .............................. JP2017-055231

(51) Int. Cl.
*F16H 3/091* (2006.01)
*B60K 17/02* (2006.01)
*B60K 17/08* (2006.01)

(52) U.S. Cl.
CPC ............. *F16H 3/091* (2013.01); *B60K 17/02* (2013.01); *B60K 17/08* (2013.01);
(Continued)

(58) Field of Classification Search
CPC ..... F16H 3/091; F16H 2702/04; B60K 17/02; B60K 17/08
(Continued)

(56) References Cited

U.S. PATENT DOCUMENTS 8,307,924 B2 * 11/2012 Wang .................... B60K 6/387
                                                                     180/65.23
9,114,699 B2 *  8/2015 Takei ...................... B60K 6/48
(Continued)

FOREIGN PATENT DOCUMENTS

CN            1603153 A      4/2005
CN          103072474 A      5/2013
(Continued)

OTHER PUBLICATIONS

Notification of Transmittal of Translation of the International Preliminary Report on Patentabililty (Form PCT/IB/338) issued in counterpart International Application No. PCT/JP2018/011093 dated Oct. 3, 2019 with Forms PCT/IB/373 and PCT/ISA/237. (5 pages).
(Continued)

*Primary Examiner* — Ha Dinh Ho
(74) *Attorney, Agent, or Firm* — Westerman, Hattori, Daniels & Adrian, LLP

(57) ABSTRACT

Provided is a power transmission device that can increase a torque that a second motor outputs to an output shaft.
The power transmission device includes:
a first input shaft and a second input shaft coupled to a first motor and a second motor, respectively, and disposed on the same axis;
a first speed reduction mechanism transmitting a rotation of the first input shaft to an output shaft via an intermediate shaft;
a second speed reduction mechanism transmitting a rotation of the second input shaft to the output shaft via the
(Continued)

intermediate shaft at a speed reduction ratio different from the speed reduction ratio of the first speed reduction mechanism;

and a first clutch disconnecting or connecting the power of the first speed reduction mechanism.

7 Claims, 3 Drawing Sheets

(52) U.S. Cl.
CPC .............. *F16H 2200/0021* (2013.01); *F16H 2200/0034* (2013.01); *F16H 2702/04* (2013.01)

(58) Field of Classification Search
USPC .......................................................... 74/661
See application file for complete search history.

(56) References Cited

U.S. PATENT DOCUMENTS

| | | | | |
|---|---|---|---|---|
| 9,370,991 | B2* | 6/2016 | Chung | B60K 6/387 |
| 9,457,658 | B2* | 10/2016 | Knoblauch | B60K 17/356 |
| 9,651,120 | B2* | 5/2017 | Morrow | F16H 3/728 |
| 2005/0067199 | A1 | 3/2005 | Shimizu | |
| 2011/0256974 | A1* | 10/2011 | Okuwaki | B60K 6/365 |
| | | | | 475/5 |
| 2015/0107407 | A1* | 4/2015 | Park | B60K 6/442 |
| | | | | 74/661 |
| 2015/0171774 | A1 | 6/2015 | Kim et al. | |
| 2015/0360552 | A1* | 12/2015 | Chung | B60K 6/38 |
| | | | | 477/5 |
| 2016/0238110 | A1* | 8/2016 | Morrow | B60K 6/365 |

FOREIGN PATENT DOCUMENTS

| | | |
|---|---|---|
| DE | 10 2013 005 721 A1 | 10/2014 |
| DE | 10 2014 109 844 A1 | 6/2015 |
| EP | 1 518 735 A1 | 3/2005 |
| JP | 2005-104215 A | 4/2005 |
| JP | 2015-85765 A | 5/2015 |
| JP | 2016-43858 A | 4/2016 |

OTHER PUBLICATIONS

Decision to Grant a Patent dated May 22, 2018, issued in counterpart of Japanese Patent Application No. 2017-055231, w/English translation (5 pages).

International Search Report dated May 29, 2018, issued in counterpart International Application No. PCT/JP2018/011093 (1 page).

Extended (Supplementary) European Search Report dated Nov. 27, 2020 issued in counterpart EP application No. 18772344.0. (8 pages).

* cited by examiner

POWER TRANSMISSION DEVICE

TECHNICAL FIELD

The present invention relates to a power transmission device. More specifically, the present invention relates to a power transmission device that transmits the outputs of two motors to an output shaft.

BACKGROUND ART

A power transmission device that transmits the respective outputs of a first motor and a second motor to an output shaft at speed reduction ratios different from each other has been known. For example, Patent Literature 1 discloses a power transmission device in which a first motor is coupled to an input shaft and a second motor is coupled to an intermediate shaft. The rotation of the input shaft driven by the first motor is transmitted to an output shaft via a first gear train and a second gear train, and the rotation of the intermediate shaft driven by the second motor is transmitted to the output shaft via the second gear train.

CITATION LIST

Patent Literature

Patent Literature 1: Japanese Unexamined Patent Application Publication No. 2005-104215

SUMMARY OF INVENTION

Technical Problem

However, in the technique disclosed in Patent Literature 1, the output Irons the second motor to the output shaft depends on the gear ratio of the second gear train, so that there is a problem that the torque that the second motor outputs to the output shaft cannot be increased.

The present invention has been made to solve the above problem, and an object of the present invention is to provide a power transmission device that can increase a torque that a second motor outputs to an output shaft.

Solution to Problem

To achieve this object, a power transmission device of the present invention includes a first input shaft and a second input shaft coupled to a first motor and a second motor, respectively, and disposed on the same axis, a first speed reduction mechanism transmitting the rotation of the first input shaft to an output shaft via an intermediate shaft, a second speed reduction mechanism transmitting the rotation of the second input shaft to the output shaft via the intermediate shaft at a speed reduction ratio different from the speed reduction ratio of the first speed reduction mechanism, and a first clutch disconnecting or connecting the power of the first speed reduction mechanism.

Advantageous Effects of Invention

In accordance with the power transmission device of aspect 1 of the present invention, the first input shaft and the second input shaft coupled to the first motor and the second motor, respectively, are disposed on the same axis. The first speed reduction mechanism transmits the rotation of the first input shaft to the output shaft via the intermediate shaft, and the first clutch disconnects or connects the transmission of the power by the first speed reduction mechanism. The second speed reduction mechanism transmits the rotation of the second input shaft to the output shaft via the intermediate shaft at a speed reduction ratio different from the speed reduction ratio of the first speed reduction mechanism. Thus, there is an effect of capable of increasing the torque that the second motor coupled to the second input shaft outputs to the output shaft.

In accordance with the power transmission device of aspect 2 of the present invention, the first clutch is disposed to the intermediate Shaft. Since the first clutch is disposed to the intermediate shaft that may be able to lower the rotation speed as compared with the input shafts and the output shaft, the lubrication failure of the first clutch can be made unlikely to occur. Thus, in addition to the effect of aspect 1 of the present invention, there is an effect of capable of securing the durability of the first clutch.

In accordance with the power transmission device of aspect 3 of the present invention, the first input shaft and the second input shaft are disconnected or connected by a second clutch. When the the first input shaft and the second input shaft are connected by the second clutch, the first input shaft and the second input shaft can be rotated by the first motor and the second motor, respectively. Thus, in addition to the effect of the first or aspect 2 of the present invention, there is an effect of capable of increasing, the torque outputted to the output shaft via the second speed reduction mechanism.

DESCRIPTION OF EMBODIMENTS

Figure 1:
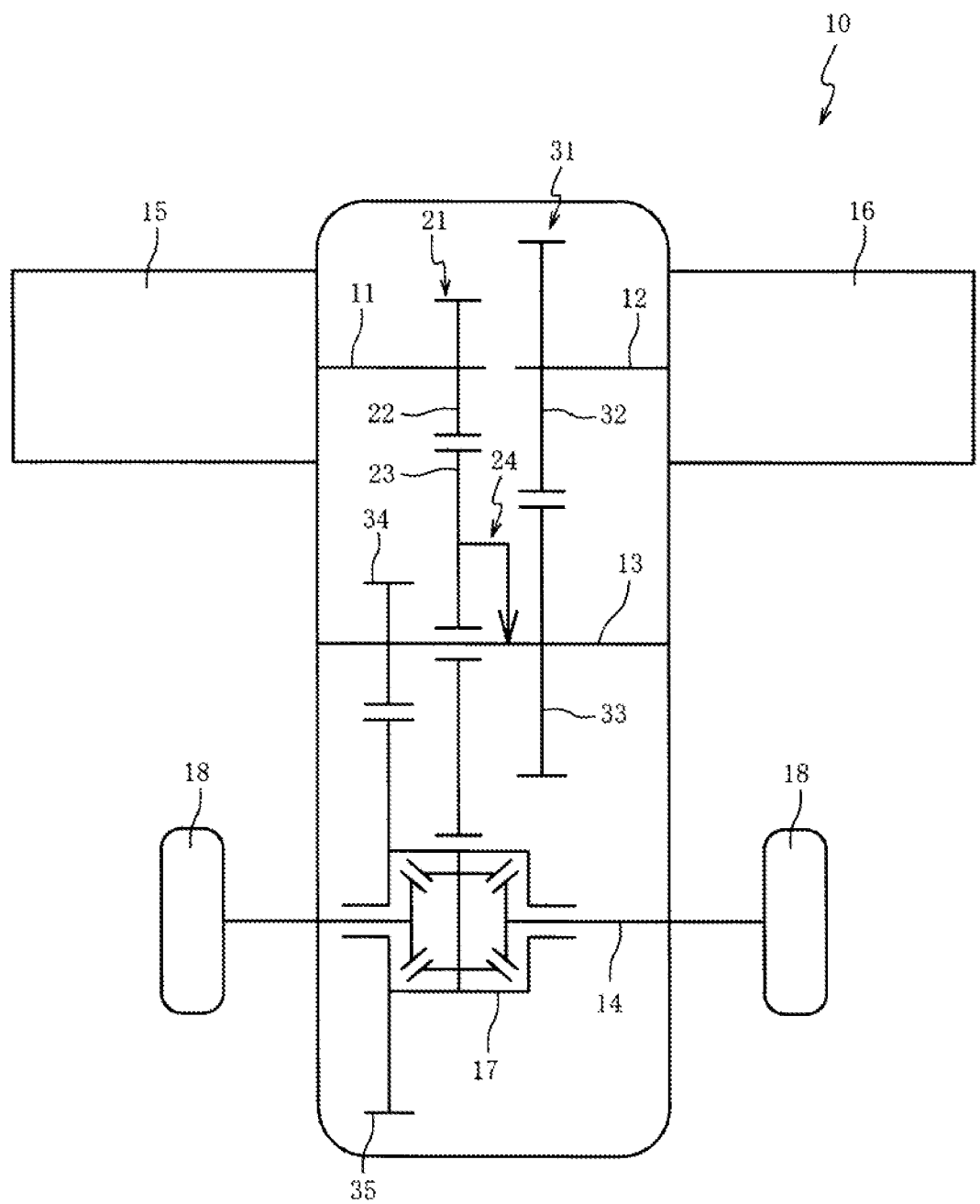
FIG. 1 is a skeleton diagram of a power transmission device according to a first embodiment.

Hereinafter, preferred embodiments of the present invention will be described with reference to the accompanying drawings. First, a power transmission device 10 according to a first embodiment of the present invention will be described with reference to FIG. 1. FIG. 1 is a skeleton diagram of the power transmission device 10 according to the first embodiment. According to this embodiment, the power transmission device 10 is mounted on a vehicle.

As illustrated in FIG. 1, the power transmission device 10 includes a first input shaft 11, a second input shaft 12, an intermediate shaft 13, and an output shaft 14. The first input shaft 11 and the second input shaft 12 are disposed on the same axis. A first motor 15 is coupled to the first input shaft 11, and a second motor 16 is coupled to the second input shaft 12. The first input shaft 11 (the second input shaft 12), the intermediate shaft 13, and the output shaft 14 are disposed in parallel.

In this embodiment, the first input shaft 11 is a main shaft directly receiving the driving force of the first motor 15, and the second input shaft 12 is a main shaft directly receiving the driving force of the second motor 16. Also, the output shaft 14 is a vehicle axis, a differential gear 17 is disposed at the center of the output shaft 14, and wheels 18 are respectively disposed at both ends of the output shaft 14. A plurality of wheels (not illustrated) other than the wheels 18 are disposed on the vehicle on which the power transmission device 10 is mounted, and the vehicle can run by the rotation driving of the output shaft 14 and the wheels 18.

The first input shaft 11 and the second input shaft 12 are relatively rotatably coupled to each other via a pilot bearing (not illustrated). With this, as compared with the case where the first input shaft 11 and the second input shaft 12 are respectively supported by bearings, the number of bearings can be reduced.

The first motor 15 is a device providing the rotation driving force to the first input shaft 11, and the second motor 16 is a device providing the rotation driving force to the second input shaft 12. In this embodiment, the first motor 15 and the second motor 16 are electrically operated motors. The first motor 15 and the second motor 16 have the same torque characteristic.

A first speed reduction mechanism 21 is a mechanism transmitting the rotation of the first input shaft 11 to the output shaft 14 via the intermediate shaft 13. The first speed reduction mechanism 21 includes a first gear 22 coupled to the first input shaft 11, and a second gear 23 disposed to the intermediate shaft 13 and engaging with the first gear 22. The first speed reduction mechanism 21 is set to a speed reduction ratio by the engaging of the first gear 22 and the second gear 23.

A first clutch 24 is disposed to the intermediate shaft 13. In this embodiment, the first clutch 24 is a one-way clutch transmitting the power in the forward direction from the second gear 23 to the intermediate shaft 13. The first clutch 24 is interposed between the intermediate shaft 13 and the second gear 23. When the first clutch 24 is connected, the second gear 23 is coupled to the intermediate shaft 13, and when the first clutch 24 is disconnected, the second gear 23 idles the intermediate shaft 13. While the first clutch 24 interceptably transmits the rotation of the second gear 23 to the intermediate shaft 13, the first clutch 24 intercepts the transmission of the rotation from the intermediate shaft 13 to the second gear 23.

A second speed reduction mechanism 31 is a mechanism transmitting the rotation of the second input shaft 12 to the output shaft 14 via the intermediate shaft 13. The second speed reduction mechanism 31 includes a third gear 32 coupled to the second input shaft 12, a fourth gear 33 coupled to the intermediate shaft 13 and engaging with the third gear 32, a fifth gear 34 coupled to the intermediate shaft 13, and a sixth gear 35 coupled to the differential gear 17 and engaging with the fifth gear 34. The second motor 16 can always transmit the power to the output shaft 14 via the second speed reduction mechanism 31.

The second speed reduction mechanism 31 is set to a speed reduction ratio different from the speed reduction ratio of the first speed reduction mechanism 21 by the engaging of the third gear 32, the fourth gear 33, the fifth gear 34, and the sixth gear 35. In this embodiment, the speed reduction ratio of the second speed reduction mechanism 31 is lower than the speed reduction ratio of the first speed reduction mechanism 21. To the second speed reduction mechanism 31, a gear train different from a gear train configuring the first speed reduction mechanism 21 is set.

The power transmission device 10 drives at least the first motor 15 at the time of starting and during running at low speed. The output of the first motor 15 is transmitted to the output shaft 14 via the first speed reduction mechanism 21 having a higher speed reduction ratio than the second speed reduction mechanism 31, so that the large driving torque is obtained from the low speed to enable powerful starting and running at low speed. At the time of the change from the low-speed running to the high-speed running, at least the second motor 16 is driven.

When the first motor 15 is driven at this time, the first motor 15 is brought into the high rotation range, so that the torque of the first motor 15 is typically reduced. However, the output of the second motor 16 is transmitted to the output, shaft 14 at the speed reduction ratio of the second speed reduction mechanism 31 lower than the speed reduction ratio of the first speed reduction mechanism 21, so that the sufficient driving torque is obtained even at high speed to enable stable acceleration.

Also, the second speed reduction mechanism 31 transmits the rotation of the second input shaft 12 to the output shaft 14 at the speed reduction ratio different from the speed reduction ratio of the first speed reduction mechanism 21, so that the torque that the second motor 16 coupled to the second input shaft 12 outputs to the output shaft 14 can be increased. Thus, the sufficient driving torque can be obtained from the low speed to the high speed.

To the second speed reduction mechanism 31, the gear train different from the gear train configuring the first speed reduction mechanism 21 is set, so that the first speed reduction mechanism 21 and the second speed reduction mechanism 31 can be set to any speed reduction ratio without affecting each other. Thus, the torque that the second motor 16 outputs to the output shaft 14 can be increased by the second speed reduction mechanism 31 without receiving the restriction of the first speed reduction mechanism 21.

When the power transmission device 10 drives the first motor 15 so that the rotation speed of the second gear 23 is relatively higher than the rotation speed of the intermediate shaft 13, the first clutch 24 is connected, and the first motor 15 outputs the torque to the output shaft 14 via the first speed reduction mechanism 21. On the other hand, when the rotation speed of the second gear 23 is relatively lower than the rotation speed of the intermediate shaft 13, the first clutch 24 is disconnected, so that the rotation speed of the first motor 15 can be prevented from being excessive. Further, it is possible to prevent the drag loss by the first motor 15 and the first speed reduction mechanism 21 when the power transmission device 10 is driven by the second motor 16 and the second speed reduction mechanism 31. Since the first clutch 24 is the one-way clutch, an actuator switching the disconnection and the connection of the clutch can be unnecessary.

The first clutch 24 is disposed to the intermediate shaft 13 that may be able to lower the rotation speed as compared with the first input shaft 11, the second input shaft 12, and the output shaft 14, so that the lubrication failure of the first clutch 24 can be made unlikely to occur. Thus, the durability of the first clutch 24 can be secured.

Figure 2:
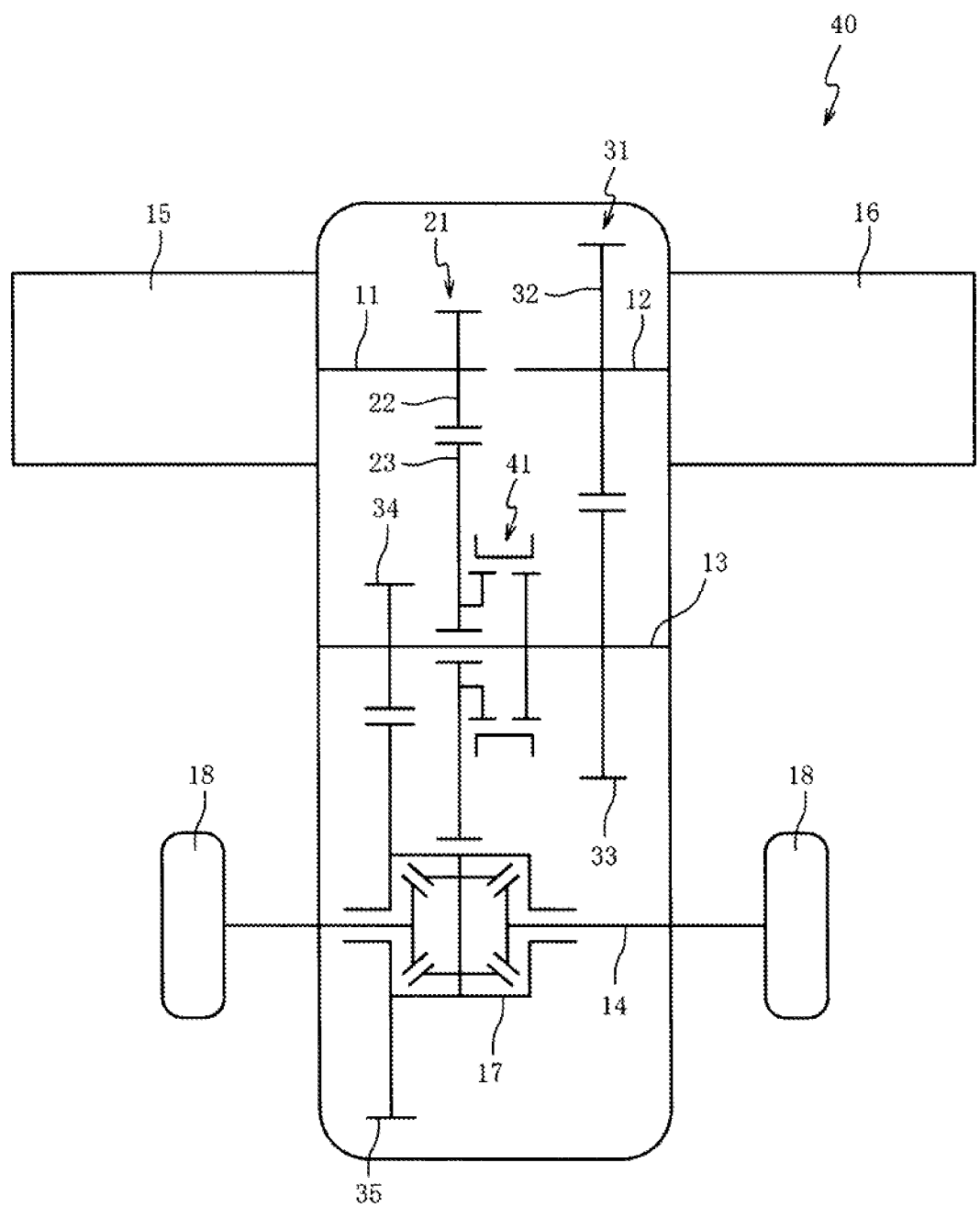
FIG. 2 is a skeleton diagram of a power transmission device according to a second embodiment.

A second embodiment will be described with reference to FIG. 2. In the first embodiment, the power transmission device 10 including the first clutch 24 including the one-way clutch has been described. On the contrary, in the second embodiment, a power transmission device 40 including a first clutch 41 including an engaging clutch will be described. It should be noted that the same portions as the portions described in the first embodiment are indicated by the same reference numerals, and the description thereafter is omitted. FIG. 2 is a skeleton diagram of the power transmission device 40 according to the second embodiment.

As illustrated in FIG. 2, in the power transmission device 40, the first clutch 41 is disposed to the intermediate shaft 13. In this embodiment, the first clutch 41 is the engaging clutch that can switch the coupling of the second gear 23 to the intermediate shaft 13 and the releasing of the second gear 23 from the intermediate shaft 13. As the engaging clutch, a gear clutch, a tooth clutch, a dog clutch, and the like are given. The first clutch 41 operates the actuator (not illustrated) to switch the disconnection and the connection.

In the power transmission device 40, when the first clutch 41 is connected, the first motor 15 outputs the torque to the output shaft 14 via the first speed reduction mechanism 21. When the first clutch 41 is disconnected, it is possible to prevent the drag loss by the first motor 15 and the first speed reduction mechanism 21 when the power transmission device 40 is driven by the second motor 16 and the second speed reduction mechanism 31. Since the first clutch 41 is made to be the engaging clutch, the configuration of the clutch can be simplified as compared with the case of using a multiple disc clutch and the like.

Figure 3:
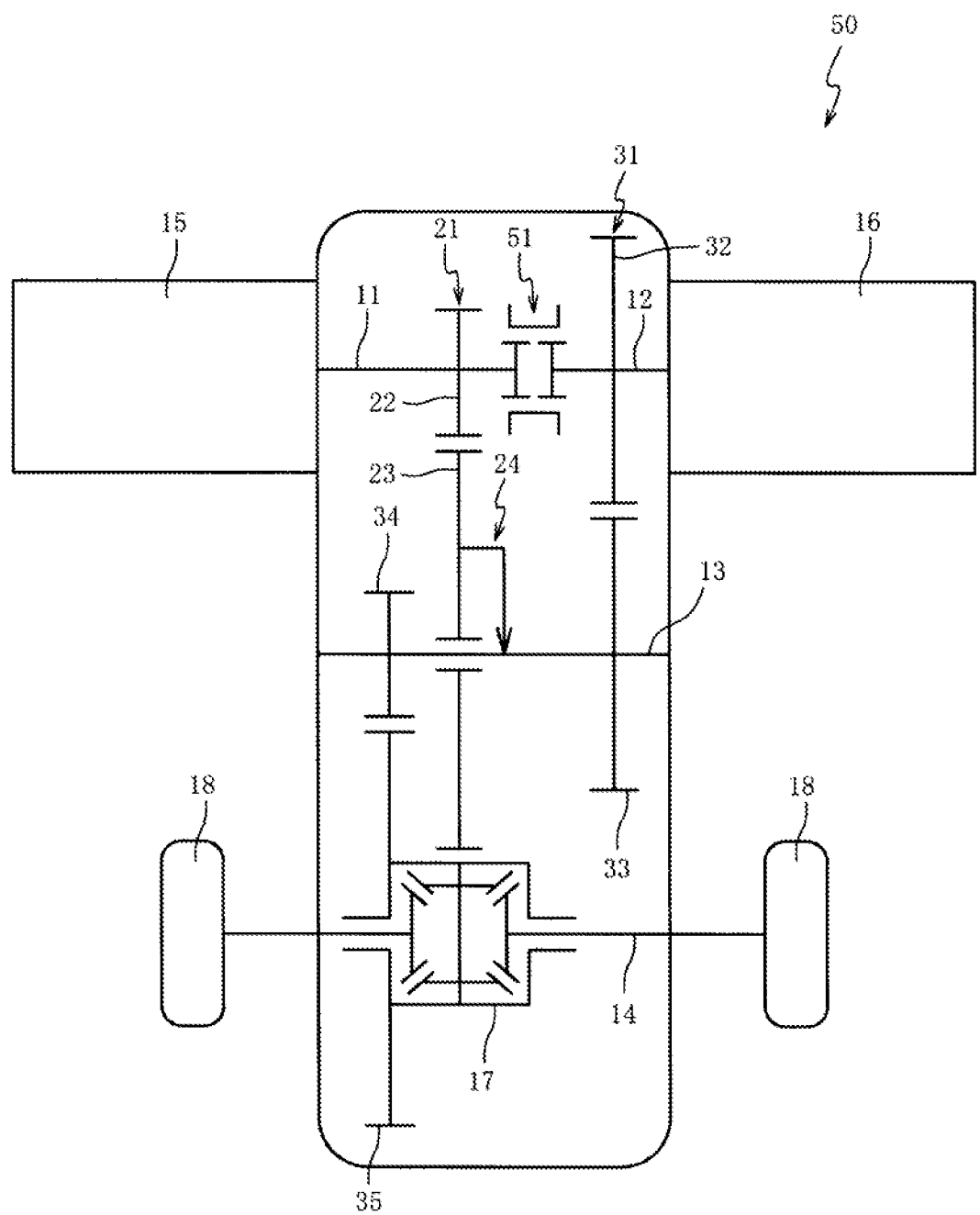
FIG. 3 is a skeleton diagram of a power transmission device according to a third embodiment.

A third embodiment will be described with reference to FIG. 3. In the first embodiment, the case where the first input shaft 11 and the second input shaft 12 are relatively rotatably coupled to each other via the pilot bearing (not illustrated) has been described. On the contrary, in the third embodiment, the case where a second clutch 51 disconnecting or connecting the first input shaft 11 and the second input shaft 12 will be described. It should be noted that the same portions as the portions described in the first embodiment are indicated by the same reference numerals, and the description thereafter is omitted. FIG. 3 is a skeleton diagram of a power transmission device 50 according to the third embodiment.

As illustrated in FIG. 3, in the power transmission device 50, the second clutch 51 is disposed between the first input shaft 11 and the second input shaft 12 disposed on the same axis. The second clutch 51 disconnects or connects the first input shaft 11 and the second input shaft 12. The second clutch 51 adopts any clutch, such as the engaging clutch and a friction clutch. Of course, synchromesh can be incorporated into the second clutch 51.

When the first input shaft 11 and the second input shaft 12 are connected by the second clutch 51, the power transmission device 50 can rotate the first input shaft 11 and the second input shaft 12 by the first motor 15 and the second motor 16, respectively. Thus, the second motor 16 and the first motor 15 that can always transmit the power to the output shaft 14 via the second speed reduction mechanism 31 are driven, so that the torque outputted to the output shaft 14 can be increased, in particular, since the torque during the high-speed running in which the torque of the first motor 15 is reduced can be increased, the sufficient driving torque is obtained even at high speed to enable acceleration.

The present invention has been described above based on the embodiments, but the present invention is not limited to the embodiments at all, and it can be easily inferred that various modifications can be made within the scope not departing from the purport of the present invention.

In the respective embodiments, the case where one intermediate shaft 13 is disposed between the first input shaft 11, the second input shaft 12, and the output shaft 14 has been described, but the present invention is not necessarily limited to this, of course, a plurality of intermediate shafts 13 can be provided, a gear can be disposed to each of the intermediate shafts 13, and a gear train configuring part of each of the first speed reduction mechanism 21 and the second speed reduction mechanism 31 can be provided to each of the intermediate shafts 13.

In the respective embodiments, the case where the electrically operated motors having the same torque characteristic are used for the first motor 15 and the second motor 16 has been described, but the present invention is not necessarily limited to this. Of course, motors having different torque characteristics can be used. For example, the motor having a torque characteristic for low speed is the first motor 15, and the motor having a torque characteristic for high speed is the second motor 16. The first motor 15 having the torque characteristic for low speed is a motor in which the torque peak value is on the low rotation side. The second motor 16 having the torque characteristic for high speed is a motor in which the torque peak value is on the high rotation side with respect to the rotation speed in which the torque of the first motor 15 is peak.

In the respective embodiments, the case where the electrically operated motors are used for the first motor 15 and the second motor 16, but the present invention is not necessarily limited to this. Of course, one of the first motor 15 and the second motor 16 can be an oil hydraulic motor, or both of the first motor 15 and the second motor 16 can be oil hydraulic motors.

In the respective embodiments, the case where the first input shaft 11 directly receives the driving force of the first motor 15 and the second input shaft 12 directly receives the driving force of the second motor 16, but the present invention is net necessarily limited to this. Of course, a gear train, a belt, and the like can be interposed between the first motor 15, the second motor 16, the first input shaft 11, and the second input shaft 12.

In the respective embodiments, although not described, when the power transmission device 10, 40, or 50 is mounted on the vehicle, the front wheels or the rear wheels can be driven by the first motor 15 and the second motor 16, and the remaining wheels are applicable to a four-wheel drive vehicle that is driven by an engine. Also, of course, the front wheel or the rear wheel is applicable to a two-wheel drive vehicle that is driven by the first motor 15 and the second motor 16.

In the respective embodiments, the case where the wheels 18 are disposed at both ends of the output shaft 14 of the power transmission device 10, 40, or 50 (when the power transmission device 10, 40, or 50 is mounted on the vehicle) has been described, but the present invention is not necessarily limited to this. Of course, the power transmission device 10, 40, or 50 can be used for a machine tool, a construction machine, an agricultural machine, and the like.

In the embodiments, the case where the first clutch 24 is the one-way clutch, the first clutch 41 is the engaging clutch has been described, but the present invention is not necessarily limited to this. Of course, the first clutch 24 can be other clutches. As other clutches, for example, a friction clutch, such as a disc clutch, a drum clutch, and a conical clutch, are given.

The invention claimed is:

1. A power transmission device comprising:
a first input shaft and a second input shaft coupled to a first motor and a second motor, respectively, and disposed on the same axis;
an intermediate shaft disposed parallel to the first input shaft and the second input shaft;
an output shaft disposed parallel to the intermediate shaft;
a first speed reduction mechanism transmitting a rotation of the first input shaft to the output shaft via the intermediate shaft at a first speed reduction ratio;
a second speed reduction mechanism transmitting a rotation of the second input shaft to the output shaft via the intermediate shaft at a second speed reduction ratio, the second speed reduction ratio being different from the first speed reduction ratio of the first speed reduction mechanism; and a first clutch disconnecting or connecting the transmission of the power of the first speed reduction mechanism, wherein the first speed reduction mechanism and the second speed reduction mechanism are parallel shaft gear reduction mechanisms.

2. The power transmission device according to claim 1, wherein the first clutch is disposed to the intermediate shaft.

3. The power transmission device according to claim 1, further comprising a second clutch disconnecting or connecting the first input shaft and the second input shaft.

4. A power transmission device comprising:
a first input shaft and a second input shaft coupled to a first motor and a second motor, respectively, and disposed on the same axis;
a first speed reduction mechanism transmitting a rotation of the first input shaft to an output shaft via an intermediate shaft at a first speed reduction ratio;
a second speed reduction mechanism transmitting a rotation of the second input shaft to the output shaft via the intermediate shaft at a second speed reduction ratio, the second speed reduction ratio being lower than the first speed reduction ratio of the first speed reduction mechanism; and
a first clutch consisting of a one-way clutch interposed between a first member to which the first speed reduction mechanism transmits rotation and a second member to which the second speed reduction mechanism transmits rotation,
wherein the first clutch connects the transmission of the power of the first speed reduction mechanism when a speed of the first member is higher than a speed of the second member, and disconnects the transmission of the power of the first speed reduction mechanism when the speed of the first member is lower than the speed of the second member.

5. The power transmission device according to claim 4, wherein the first clutch is disposed to the intermediate shaft.

6. The power transmission device according to claim 5, wherein the second member is the intermediate shaft, and the first member is a gear disposed on the intermediate shaft.

7. A power transmission device comprising:
a first input shaft and a second input shaft coupled to a first motor and a second motor, respectively, and disposed on the same axis;
a first speed reduction mechanism transmitting a rotation of the first input shaft to an output shaft via an intermediate shaft at a first speed reduction ratio;
a second speed reduction mechanism transmitting a rotation of the second input shaft to the output shaft via the intermediate shaft at a second speed reduction ratio, the second speed reduction ratio being different from the first speed reduction ratio of the first speed reduction mechanism;
a first clutch disconnecting or connecting the transmission of the power of the first speed reduction mechanism; and
a second clutch disconnecting or connecting the first input shaft and the second input shaft.

* * * * *